(12) United States Patent
Broussard

(10) Patent No.: US 8,528,921 B2
(45) Date of Patent: Sep. 10, 2013

(54) INTERCHANGEABLE DECK AND NECK SYSTEM FOR SCOOTERS

(76) Inventor: Andrew D. Broussard, Vista, CA (US)

( * ) Notice: Subject to any disclaimer, the term of this patent is extended or adjusted under 35 U.S.C. 154(b) by 11 days.

(21) Appl. No.: 13/230,727

(22) Filed: Sep. 12, 2011

(65) Prior Publication Data
US 2013/0062847 A1    Mar. 14, 2013

(51) Int. Cl.
*B62M 1/00*  (2010.01)
(52) U.S. Cl.
USPC ............... 280/87.05; 280/87.01; 280/87.021; 280/87.041
(58) Field of Classification Search
USPC ............... 280/87.01, 87.021, 87.042, 14.21, 280/14.27, 14.28, 655.1, 63, 270, 287, 263; 403/91, 103, 113, 116, 109.5; 16/429, 900
See application file for complete search history.

(56) References Cited

U.S. PATENT DOCUMENTS 6,305,698 B1 * 10/2001 Liang ...................... 280/87.041

* cited by examiner

*Primary Examiner* — John Walters
*Assistant Examiner* — James Triggs
(74) *Attorney, Agent, or Firm* — Brooks Gifford, III

(57) ABSTRACT

An interlocking neck and deck system for scooters includes an elongate deck having a front end with a longitudinal neck-receiving slot with a first profile and at least one lateral locking member receiver. A removable and interchangeable neck is engageable with the deck. The neck includes a lower mounting portion with a second profile complementary to the first profile of the neck-receiving slot and at least one lateral locking member receiver complementary to the at least one lateral locking member receiver of the deck. The neck also includes an upper stem-receiving portion comprising a bore. At least one lateral locking member is engageable with the lateral locking member receivers of the deck and neck when the removable neck is mated with the longitudinal neck-receiving slot of the deck.

13 Claims, 10 Drawing Sheets

INTERCHANGEABLE DECK AND NECK SYSTEM FOR SCOOTERS

FIELD

The following description relates generally to rolling platforms such as scooters, and in particular to a system for customizing scooters with interchangeable necks.

BACKGROUND

Scooter riding has recently become a popular recreational activity and an alternative to pursuits such as skateboarding, bike riding, inline skating, etc. In particular, in recent years advanced riders have developed new riding techniques and maneuvers for scooters including riding on ramps, obstacles and performing large jumps that place extreme amounts of stress on the scooter components. Scooters designed for "cruising" or designed without extreme performance demands in mind may fail structurally when landing large jumps, grinding or sliding on obstacles, or otherwise performing new maneuvers that were not accounted for by conventional scooter designs.

In particular, a common point of failure in scooters is the joint between the neck and the deck. The neck of the scooter is the component used to connect the handlebar stem, which is the substantially vertical post with handlebars adjacent to the upper end, to the deck of the scooter, which is the substantially horizontal platform upon which the rider stands. The neck is also used to mount the front fork, which includes a substantially vertical head tube received by a bottom surface of the neck. The front wheel is mounted to the fork, and the head tube and the stem are coupled together by a coupler above the neck. Most conventional scooters have two wheels attached to the deck, though scooters with more than two wheels also exist. Many scooters, though not all, include a hinged joint between the head stem and the deck. To the extent such a hinged joint is present, structural failures in the neck of the scooter are even more likely to occur if the scooter is used for high-performance riding that the original scooter designers may not have considered.

Finally, another drawback of conventional scooter designs is that the necks and decks are generally permanently connected to each other. Different styles or techniques of riding may be better suited to different, neck, stem or handlebar designs, or different angles of the stem relative to the deck. However, for a rider who desires optimal equipment for different riding styles, this has in the past required the rider to purchase several different scooters with different performance characteristics.

Accordingly, there is a need for a scooter design that provides a ruggedized connection or neck between the stem and the deck of a scooter. Further, this ruggedized connection would ideally be interchangeable so that riders may customize and optimize their equipment in response to varying conditions and performance goals.

SUMMARY

The embodiments of a removable and interchangeable neck and deck system for scooters disclosed below satisfy the needs outlined above. The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, an interlocking neck and deck system for scooters includes an elongate deck having a front end and a rear end. The rear end of the deck includes a wheel-receiving portion and the front end of the deck includes a longitudinal neck-receiving slot with a first profile and at least one lateral locking member receiver. The system also includes a removable neck with a lower mounting portion with a second profile complementary to the first profile of the neck-receiving slot of the deck. The neck also includes at least one lateral locking member receiver complementary to the at least one lateral locking member receiver of the deck. The neck further includes an upper stem-receiving portion with a bore. At least one lateral locking member is engageable with the at least one lateral locking member receiver of the deck and with the at least one lateral locking member receiver of the removable neck when the lower mounting portion of the removable neck is mated (engaged) with the longitudinal neck-receiving slot of the deck.

In some embodiments, the first profile of the neck-receiving slot may include a groove and the second profile of the lower mounting portion of the removable neck may include a tongue complementary to the groove. Similarly, the first profile of the neck-receiving slot may include a tongue and the second profile of the lower mounting portion of the removable neck may include a groove complementary to the tongue. In any of these embodiments, the respective tongues and grooves may be, for example, dovetail-shaped. In some embodiments, the lower mounting portion of the removable neck may include an elongate flange receivable by the neck-receiving slot of the deck.

Various embodiments of the interlocking neck and deck system for scooters may include a lateral locking member comprising a pin that is laterally insertable through the at least one lateral locking member receiver of the deck and through the at least one lateral locking member receiver of the removable neck. Further, the pin may be or include a threaded fastener, for example a barrel bolt with an internally threaded bore. In various embodiments there may be three lateral locking member receivers in the neck-receiving slot of the deck and the lower mounting portion of the neck. If so, the system also includes three lateral locking members.

In some embodiments, the profiles of the neck-receiving slot and the lower mounting portion of the neck may include combinations of multiple complementary tongues and grooves. Finally, the bore of the upper-stem receiving portion of the neck may be at an angle relative to vertical (i.e. relative to the deck when the deck is horizontal). For example, the bore of the upper stem-receiving portion of the removable neck may be at a longitudinal angle of between 75 and 95 degrees relative to the longitudinal neck-receiving slot of the deck.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
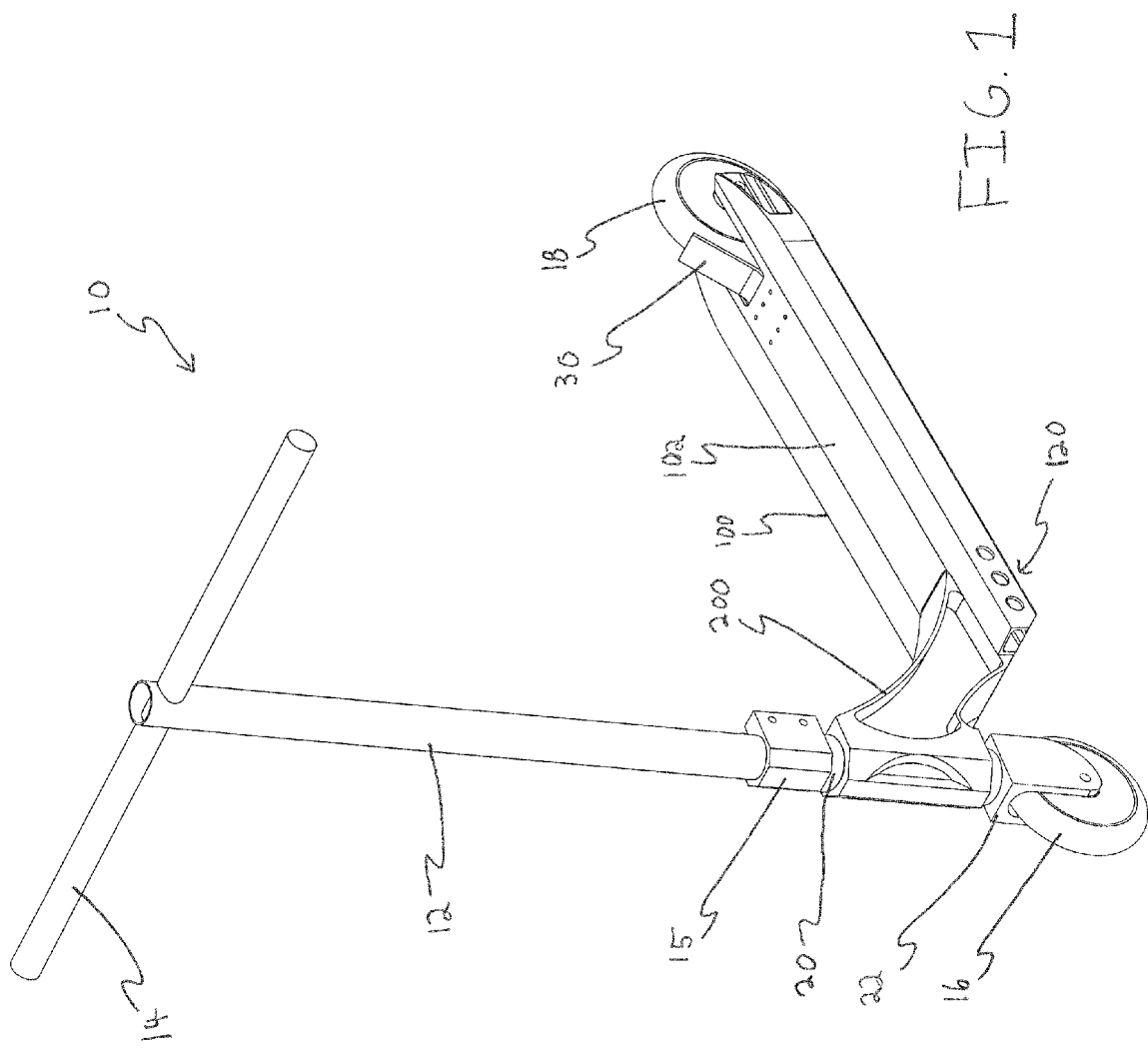
FIG. 1 is a perspective view of one embodiment of a scooter with an interlocking and interchangeable neck and deck.

The following disclosure relates to various improvements for scooters of the type having a rolling platform (e.g. a deck) for a user to ride upon, handle bars, a stem (e.g. a handlebar stem), a front fork coupled to the stem, and a joint connecting the stem to the rolling platform, for example kick scooters and related devices. Although this disclosure focuses on scooters, it is to be understood that the disclosed embodiments may be applied to any other type of rolling platform or vehicle, and that kick scooters are only one of many possible applications for the disclosed embodiments.

In one aspect of the disclosed embodiments, an interlocking neck and deck system for scooters includes an elongate deck having a front end with a longitudinal neck-receiving slot with a first profile and at least one lateral locking member receiver. A removable and interchangeable neck is engageable with the deck. The neck includes a lower mounting portion with a second profile complementary to the first profile of the neck-receiving slot and at least one lateral locking member receiver complementary to the at least one lateral locking member receiver of the deck. The neck also includes an upper stem-receiving portion comprising a bore. At least one lateral locking member is engageable with the lateral locking member receivers of the deck and neck when the removable neck is mated with the longitudinal neck-receiving slot of the deck.

In some embodiments, the lower mounting portion of the neck includes one or more tongues and/or grooves that are complementary and engageable with one or more grooves and/or tongues in the deck, such that when the mounting portion of the neck is slid into the neck-receiving slot of the deck, the various complementary tongues and grooves mate with one another. Once the neck and deck are slidingly engaged in this manner, they may be locked into place using one or more lateral locking members. The lateral locking members pass through lateral locking member receivers in the mounting portion of the neck and in the neck-receiving slot of the deck. Once so inserted, the neck is locked to the deck with the various tongues/grooves of the neck mated with the complementary grooves/tongues of the deck.

In particular, it should be noted that the locking members prevent the mounting portion of the neck from sliding relative to the neck-receiving slot of the deck. In other words, the forces exerted on the neck and deck by a rider are borne primarily by the sliding engagement between the mounting portion of the neck and the neck-receiving slot of the deck, not the locking members. As the mounting portion of the neck and the neck-receiving slot of the deck each comprises elongate flat surfaces that mate with each other (e.g. tongues and grooves, flanges and slots, etc.), the region of mutual engagement has a relatively large surface area that is particularly efficient in bearing, distributing and absorbing forces. This is particularly true compared to conventional scooter designs where the joint between the head stem and the deck is essentially a pin or weld in which forces are extremely concentrated at the joint and easily lead to failure of the joint.

Figure 2:
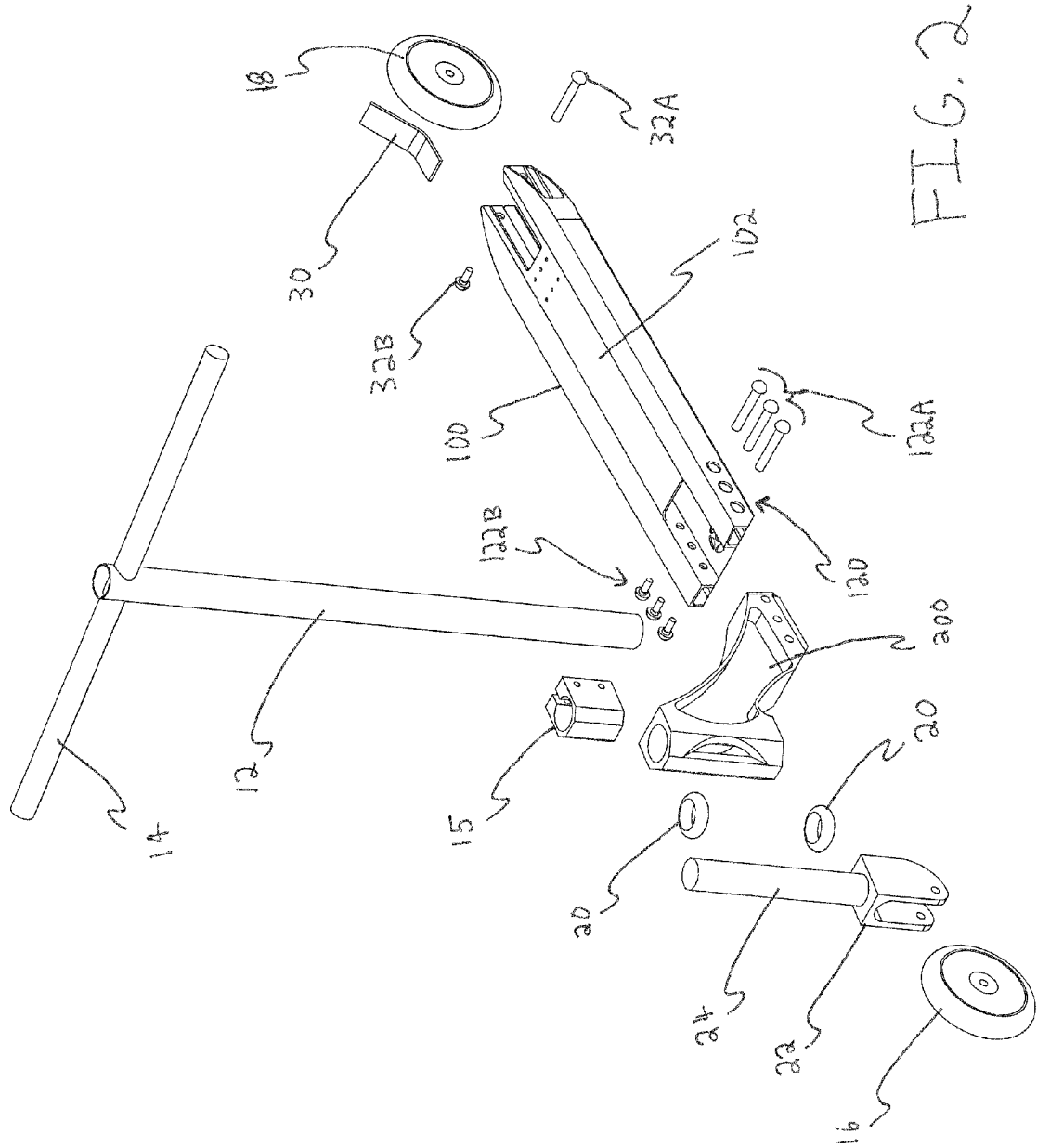
FIG. 2 is an exploded perspective view of the embodiment of FIG. 1.

Exemplary embodiments of the devices disclosed above will now be discussed reference to the figures. FIGS. 1 and 2 show perspective and exploded views of a scooter with an interlocking neck and deck system. Scooter 10 includes a riding platform designated as deck 100 upon which a rider stands. A rider standing on deck 100 grips handlebars 14 at the upper end of stem 12. Stem 12 is connected to deck 100 by neck 200. Also connected to neck 200 is fork 22 which includes head (steerer) tube 24 which is received by neck 200. Mounted to fork 22 is front wheel 16. Stem 12 and head tube 24 are coupled to each other by coupler 15. Coupler 15 may be a compression coupler such as the one disclosed in U.S. Patent Publication 2011/0200385 by the present inventor, though this is not a required feature and other types of couplers may also be used. Mounted between coupler 15 and neck 200, and between fork 22 and neck 200, are bearings 20 which facilitate rotation of stem 12 and fork 22 relative to neck 200.

At the rear end of deck 100 is rear wheel 18 which is mounted to deck 100 by axle bolt 32A and axle nut 32B. A rider stands on deck 100 and uses one foot to push off on the ground in order to generate speed, while gripping the handlebars for stability and in order to steer. As is known the art, scooter 10 may be provided with rear brake 30 actuatable by the rider. However, the present disclosure is primarily focused on improvements in the connection between neck 200 and deck 100. Accordingly, the present disclosure does not focus on the wheels, fork, stem, handlebars and brakes found in known scooters.

Figure 3:
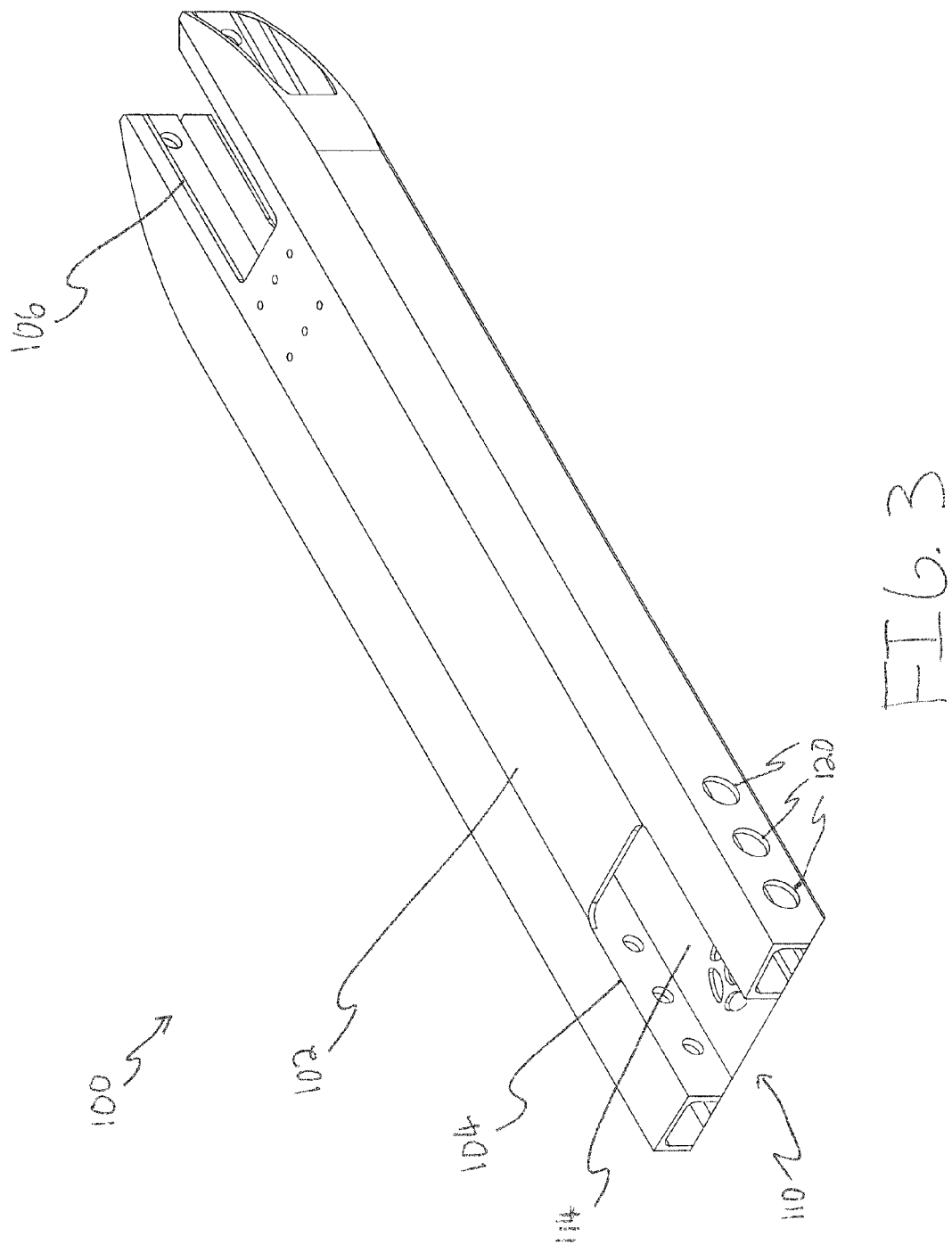
FIG. 3 is a perspective view of the deck of the embodiment of FIG. 1

FIG. 3 shows a perspective view of deck 100 for use with an interchangeable deck and neck system for scooters. Deck 100 includes upper riding surface 102, neck-receiving slot 104 at the front end, and wheel receiving portion 106 at the rear end. As seen in the figures, deck 100 is elongate with an upper riding surface 102 for bearing the weight of a rider. Upper riding surface 102 is substantially flat, though in various embodiments may be slightly concave or convex. Neck-receiving slot 104 comprises a cutaway in upper riding surface 102 along the longitudinal axis of deck 100. Neck receiving slot 104 has a front profile 110 shaped to receive neck 200, and a substantially flat bottom surface 114, in order to accommodate sliding engagement with neck 200 as will be described in further detail below. Neck-receiving slot 104 also includes one or more lateral locking member receivers 120. In the illustrated embodiment, lateral locking member receivers 120 are lateral cross-holes or apertures capable of receiving pins, bolts, rods, etc., as will be described in further detail below.

Figure 4:
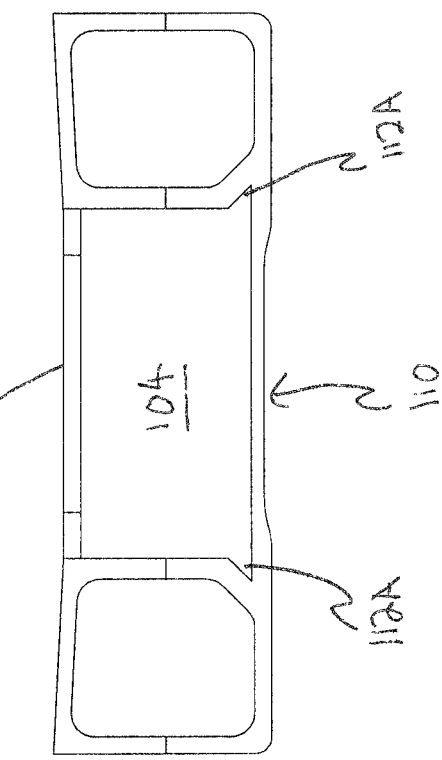
FIG. 4 is a front elevation view of the deck of FIG. 3, showing exemplary locations for grooves in a neck-receiving slot of the deck.

FIG. 4 shows a front elevation view of deck 100, and in particular shows front profile 110 of neck-receiving slot 104 of deck 100. In the illustrated embodiment, front profile 110 of neck-receiving slot 104 is generally dovetail shaped with grooves 112A along the bottom of neck-receiving slot 104. It is to be understood that grooves 112A may be of any shape including wedge shaped, triangular shaped, rectangle shaped, semi-circular, etc. without departing from the scope of this disclosure. Further, grooves 112A are not necessarily located along the bottom of neck-receiving slot 104 and may also be located adjacent the top of neck-receiving slot 104 or adjacent the center of neck-receiving slot 104. Finally, although not illustrated in this figure, front profile 110 of neck-receiving slot 104 may also include flanges, protrusions or tongues instead of, or in addition to, grooves 112A.

Figure 5:
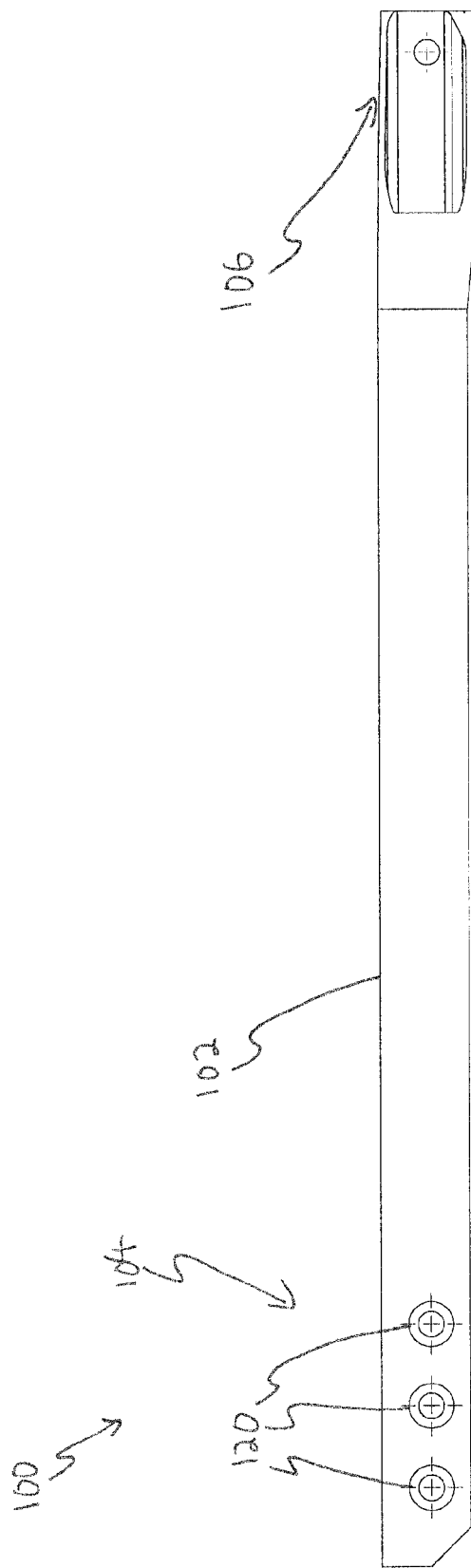
FIG. 5 is a side profile view of the deck of FIG. 3, showing the location of the lateral locking member receivers for securing the neck to the deck.

FIG. 5 shows a side profile view of deck 100. As can be seen, lateral locking member receivers 120 are disposed at the front end of deck 100 and transverse neck-receiving slot 104. Although three lateral locking member receivers 120 are illustrated, it is to be understood that the precise number of lateral locking member receivers 120 is not critical. For example, there may be one, two, three, four or more lateral locking member receivers 120 without departing from the scope of the present disclosure.

Figure 6:
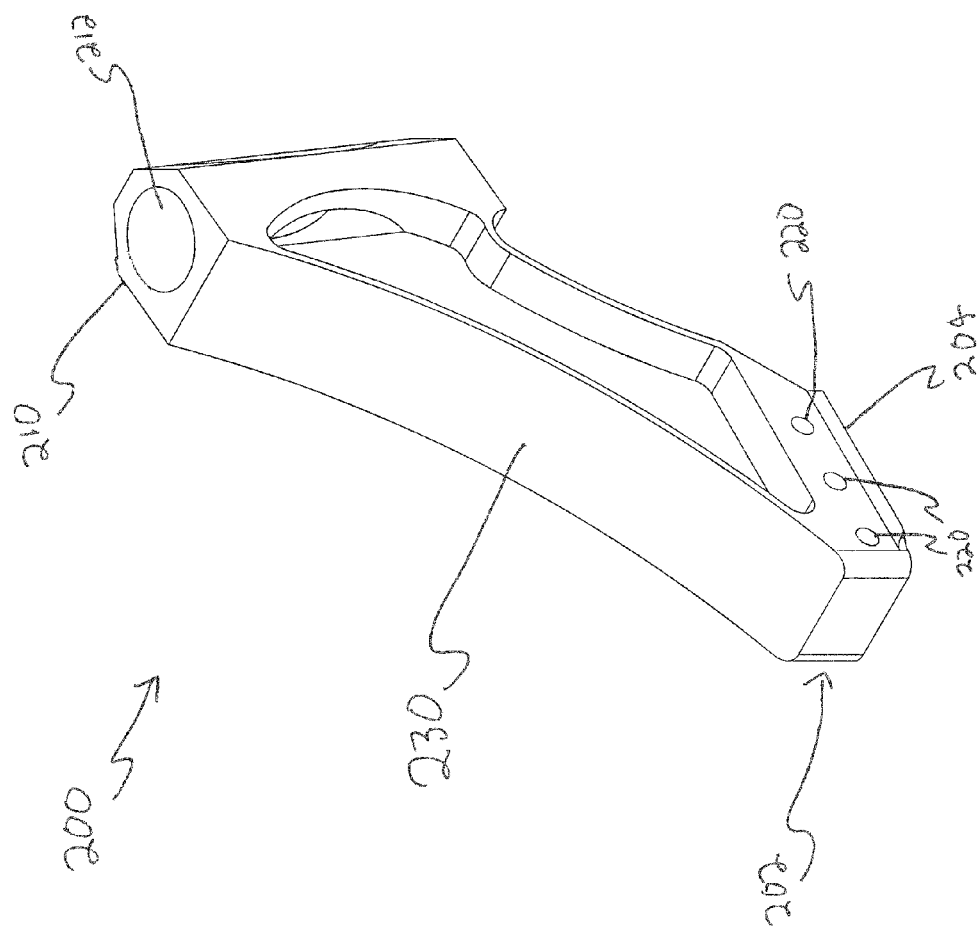
FIG. 6 is a perspective view of one embodiment of the removable and interchangeable neck of FIG. 1.
Figure 7:
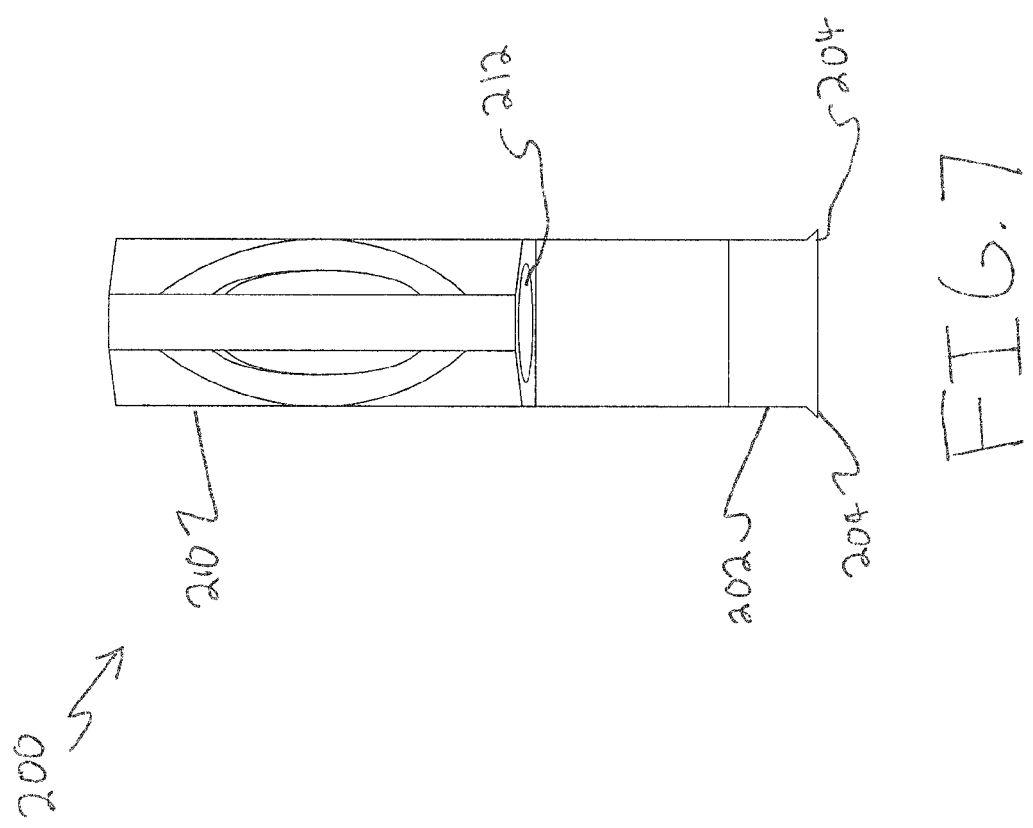
FIG. 7 is a front profile view of the neck of FIG. 6.
Figure 8:
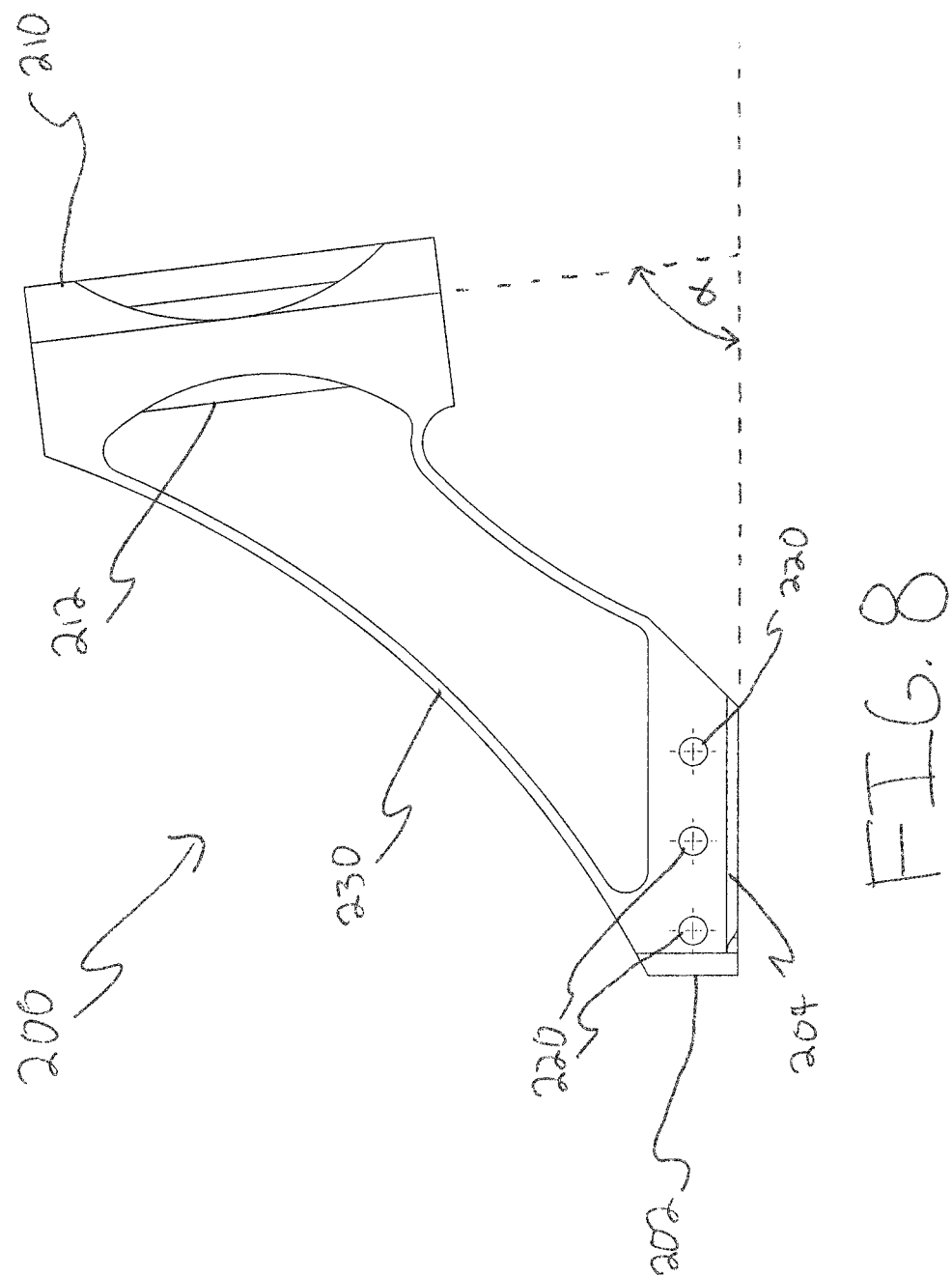
FIG. 8 is a side profile view of the neck of FIG. 6.

FIGS. 6-8 show a perspective view of neck 200. Neck 200 slidingly engages with deck 100. More specifically, neck 200 includes lower mounting portion 202 and upper stem-receiving portion 210 which are integrally formed with central spine 230. Upper stem-receiving portion 210 includes bore 212 into which stem 12 and head tube 24 of fork 22 are inserted. Bearings 20 preferably couple stem 12 and fork 22 with bore 212 to facilitate rotation of stem 12 relative to neck 200. Lower mounting portion 202 of neck 200 includes tongue 204. In the illustrated embodiments, tongue 204 comprises a flat bottom surface and laterally extending wedges. In other words, in the illustrated embodiments, tongue 204 forms a dovetail. However, it is to be understood that this is only one possible configuration of tongue 204, and any other suitable profile shape may be used. It can thus be seen that tongue 204 is complementary to grooves 112 of neck-receiving slot 104. In other words, the profile of lower mounting portion 202 of neck 200 is complementary to (i.e. "matches") the profile 110 of neck-receiving slot 104. Thus, lower mounting portion 202 of neck 200 may be slid into neck-receiving slot 104 in order to engage or mate neck 200 with deck 100.

Once neck 200 is thus slidably engaged with deck 100, they may be locked together by inserting locking members such as pins or bolts 122A and nuts 122B through locking member receivers 220 of neck 200 and through locking member receivers 120 of deck 100 (see FIG. 2). Once these locking members or cross-members are thus inserted, neck 200 and deck 100 are no longer slidable relative to one another. The locking members may be any type of pin, bolt, rod, or the like, including internally threaded bolts such as barrel bolts. It is to be understood that the locking members could alternatively or additionally be oriented vertically (with corresponding vertical locking member receivers in the deck and neck). However, providing lateral locking members has been found to provide benefits including additional structural stability when the lateral locking members are tightened.

Figure 9:
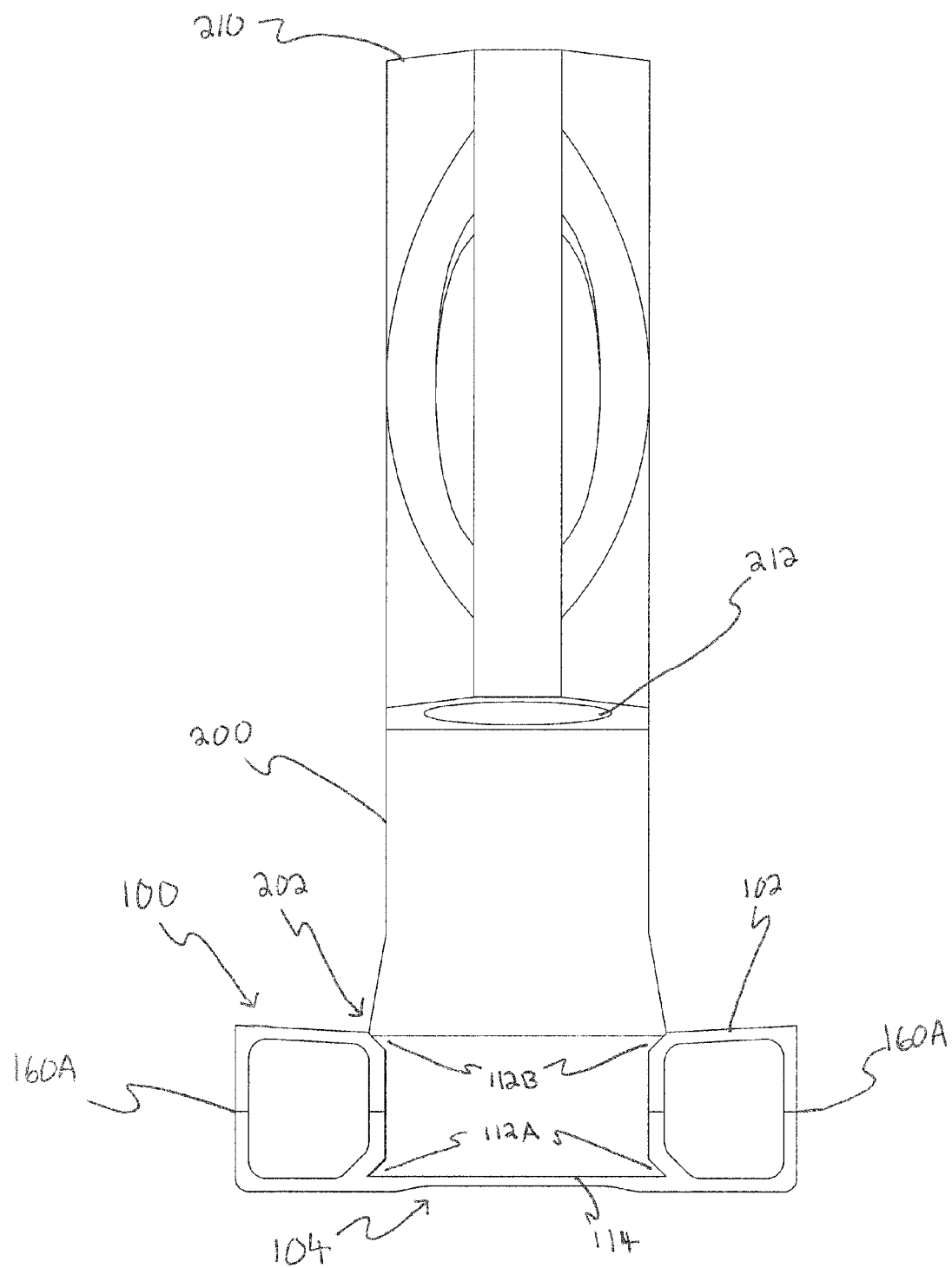
FIG. 9 shows a front elevation view of an alternative profile shape for a neck receiving slot of the deck of FIG. 3.

FIG. 9 shows one of many possible alternative profile shapes for neck receiving slot 104 of deck 100 and for lower mounting portion 210 of neck 200. Unlike in FIG. 4, in this figure deck 100 is shown with neck 200 engaged with neck-receiving slot 104. Profile 110 includes grooves 112A (similar to those shown in FIG. 4) along the flat lower surface 114 of neck receiving slot 104. Additionally, in this embodiment, profile 110 of neck-receiving slot 104 further includes grooves 112B adjacent the upper end of neck-receiving slot 104 that mate and slidably engage with complementary shaped tongues in lower mounting portion 202 of neck 200. Finally, although only by way of example and not intended as a limitation, the cross-section of deck 100 may be generally rectangular and include lateral tubes 160A. It can be appreciated that if deck 100 has a constant cross-section along its length, manufacturing deck 100 by extrusion is facilitated.

Figure 10:
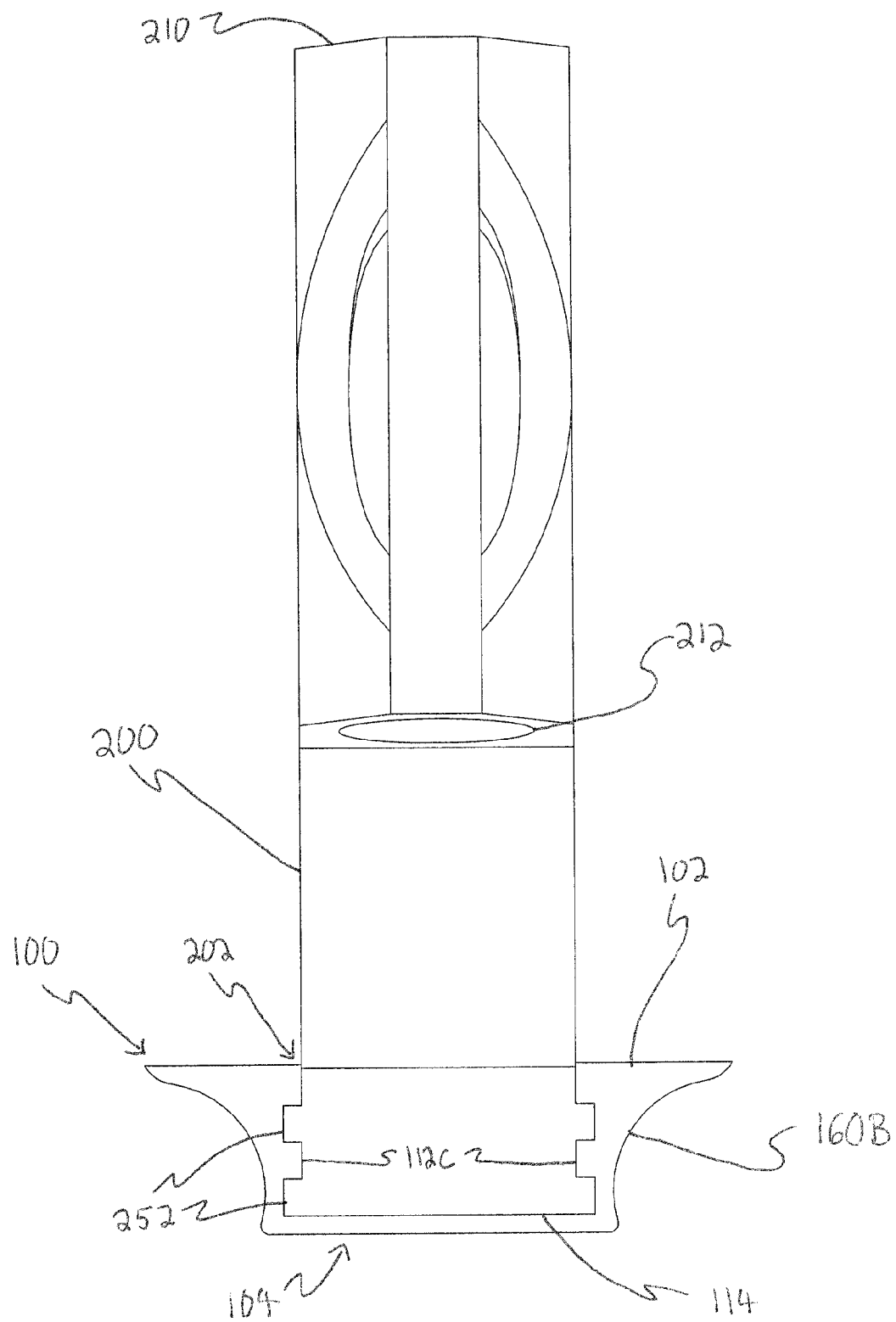
FIG. 10 shows a front elevation view of another alternative profile shape for a neck receiving slot of the deck of FIG. 3.

Another alternative embodiment of profile 110 of neck-receiving slot 104 of deck 100 (and of lower mounting portion 202 of neck 200) is shown in FIG. 10, in which neck 200 is shown engaged in neck-receiving slot 104. In this embodiment, profile 110 includes tongues 112C protruding inwardly to engage with a groove formed between tongues 252 of lower mounting portion 202 of neck 200. As in the previous embodiments the profiles of neck-receiving slot 104 and lower mounting portion 202 of neck 200 are complementary so that neck 200 and deck 100 are slidably engageable. As in the previously disclosed embodiments, once neck 200 and deck 100 are slidably engaged, they may be locked together by inserting lateral locking members (such as locking members 122 disclosed above) through lateral locking member receivers 120 and 220 of deck 100 and neck 100 respectively, which are all aligned when neck 100 and deck 200 are fully engaged.

It can thus be seen that the disclosed embodiments provide an extremely rugged and robust joint between neck 200 and deck 100. Tongue 204 and neck receiving slot 104 contact one another over a relatively wide and flat region. This large surface area contact helps to greatly distribute impact and shearing forces between neck 200 and deck 100. Whereas if neck 200 and deck 100 were simply connected by a bolt or at a relatively narrow joint, large forces would tend to cause the connection between neck 200 and deck 100 to fail. In the presently disclosed embodiments, the connection between neck 200 and deck 100 comprises a large surface area so that there is not a single point where forces are concentrated or magnified such that a failure would occur in extreme riding situations.

Another advantage of the presently disclosed embodiments is that neck 200 is removable from deck 100, such that a rider may have several different necks and decks and the capability of making custom combinations. For example, if a rider has three different necks and three different decks, the rider may combine the components to form nine different scooters. One reason a rider may wish to perform such customization is the angle of bore 212 of stem-receiving portion 210 of neck 200. Depending on riding conditions and the rider's style and goals, it may be preferable to have stem 12 at different angles relative to deck 100. Thus, a rider may choose to utilize several different necks 200, each having a bore 212 at a different angle. For example, as best shown in FIG. 8, bore 212 is at an angle $\alpha$ relative to tongue 204 of lower mounting portion 202 of neck 200. As tongue 204 is generally parallel to bottom surface 114 of neck-receiving slot 104, the angle $\alpha$ is also the angle between bore 212 (and thus stem 12) and deck 100. In particular, necks may be provided in which the angle $\alpha$ is anywhere between 70 and 90 degrees, although this should not be considered a limitation as other angles are also contemplated.

The materials used to construct scooter 10, deck 100 and neck 200 are not critical and are not within the scope of this disclosure. However, possible materials include metals such as aluminum, aluminum alloys, steel, titanium, polymers such as plastics, or other materials such as carbon fiber. One advantage of the presently disclosed embodiments is that deck 100 may have a constant profile so that deck 100 may be extruded. This leads to significant savings in the cost and ease of manufacturing. Neck 200 may be made by machining a metal billet with a lower mounting profile that matches commonly available profiles of decks. In this way, a rider may amass a "quiver" of different necks and decks that are interchangeable with each other, thereby providing nearly a potentially infinite number of possible combinations of deck and neck configurations. Additionally, it is to be understood that the precise methods of manufacturing the various components are not critical. Components may be manufactured by extrusion, casting, forging, machining or any other method without departing from the scope and spirit of the present disclosure.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An interlocking neck and deck system for scooters, comprising:
    an elongate deck having a front end and a rear end, the rear end of the deck comprising a wheel-receiving portion and the front end of the deck comprising a longitudinal neck receiving slot with a first profile and at least one lateral locking member receiver;
    a removable neck, comprising:
        a lower mounting portion having a second profile complementary to the first profile of the neck-receiving slot and at least one lateral locking member receiver complementary to the at least one lateral locking member receiver of the deck; and
        an upper stem-receiving portion comprising a bore; and
    at least one lateral locking member engageable with the at least one lateral locking member receiver of the deck and with the at least one lateral locking member receiver of the removable neck when the lower mounting portion of the removable neck slides into and mates with the longitudinal neck-receiving slot of the deck to form an elongate rigid planar bearing that distributes forces exerted between the deck and the removable neck.

2. The interlocking neck and deck system for scooters of claim 1, wherein the first profile of the neck-receiving slot comprises a groove and the second profile of the lower mounting portion of the removable neck comprises a complementary tongue that slides into the groove of the neck-receiving slot to mate with the deck.

3. The interlocking neck and deck system for scooters of claim 1, wherein the first profile of the neck-receiving slot comprises a tongue and the second profile of the lower mounting portion of the removable neck comprises a complementary groove into which the tongue of the neck-receiving slot slides to mate with the neck.

4. The interlocking neck and deck system for scooters of claim 2, wherein the groove in the neck-receiving slot of the deck is dovetail-shaped.

5. The interlocking neck and deck system for scooters of claim 3, wherein the groove in the mounting portion of the removable neck is dovetail-shaped.

6. The interlocking neck and deck system for scooters of claim 1, wherein the lower mounting portion of the removable neck comprises an elongate flange receivable by the neck-receiving slot of the deck.

7. The interlocking neck and deck system for scooters of claim 1, wherein the at least one lateral locking member comprises a pin laterally insertable through the at least one lateral locking member receiver of the deck and through the at least one lateral locking member receiver of the removable neck.

8. The interlocking neck and deck system for scooters of claim 7, wherein the pin comprises a threaded fastener.

9. The interlocking neck and deck system for scooters of claim 8, wherein the threaded fastener includes a barrel bolt with an internally threaded bore.

10. The interlocking neck and deck system for scooters of claim 1, wherein the neck-receiving slot of the deck has three lateral locking member receivers, wherein the lower mounting portion of the removable neck has three lateral locking member receivers, and wherein the interlocking neck and deck system includes three lateral locking members.

11. The interlocking neck and deck system for scooters of claim 2, wherein the first profile of the neck-receiving slot comprises a plurality of grooves and the second profile of the lower mounting portion of the removable neck comprises a plurality of tongues complementary to the plurality of grooves.

12. The interlocking neck and deck system for scooters of claim 3, wherein the first profile of the neck-receiving slot comprises a plurality of tongues and wherein the second profile of the lower mounting portion of the removable neck comprises a plurality of grooves complementary to the plurality of tongues.

13. The interlocking neck and deck system for scooters of claim 1, wherein the bore of the upper stem-receiving portion of the removable neck is at a longitudinal angle of between 75 and 95 degrees relative to the longitudinal neck-receiving slot of the deck.

\* \* \* \* \*